Feb. 12, 1963     M. D. BENNETT ETAL     3,077,204
ELASTIC BALL CHECK VALVE
Filed Dec. 5, 1957
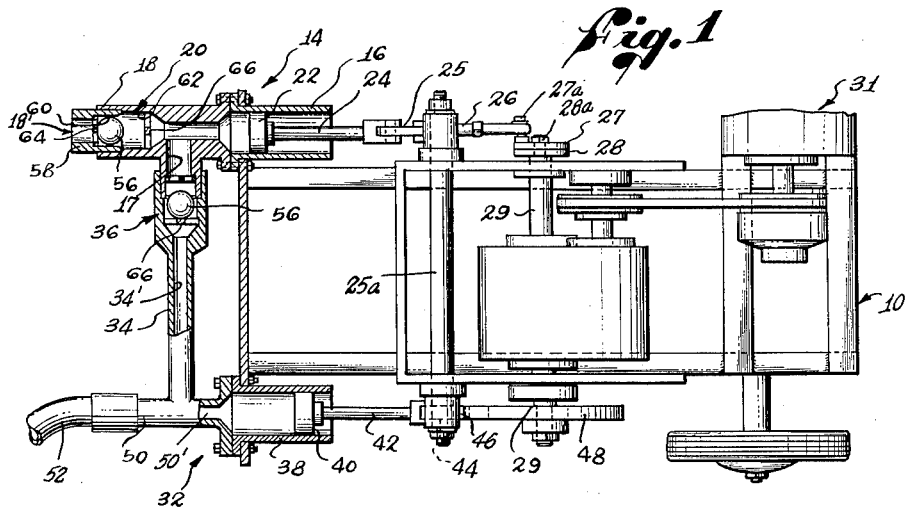
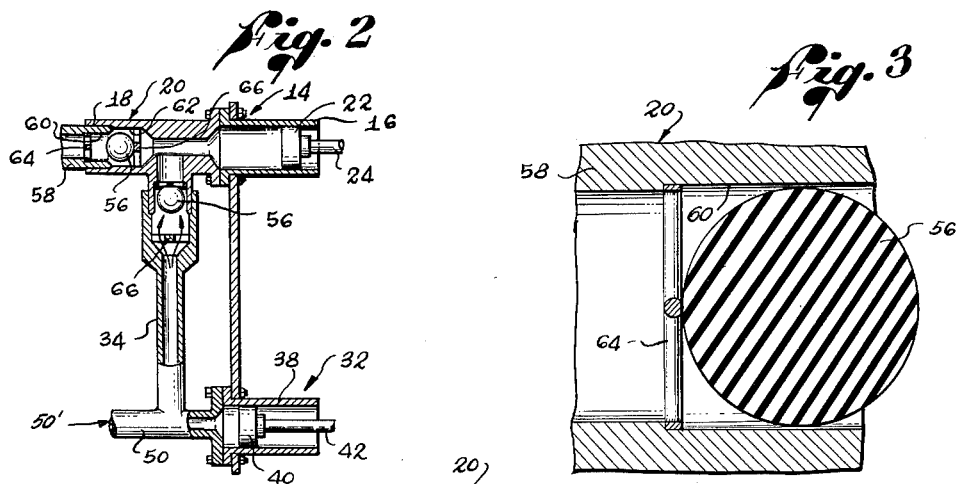
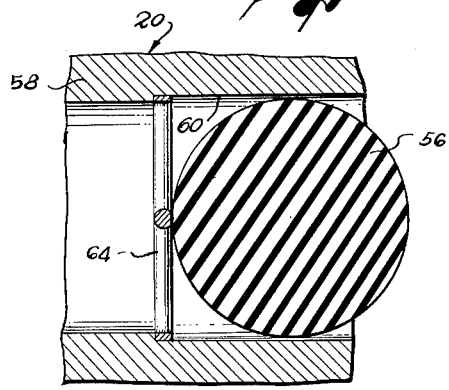
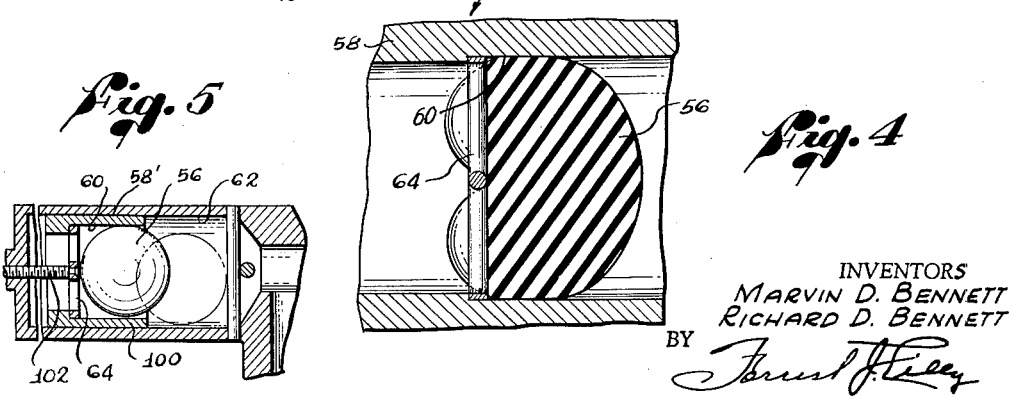
INVENTORS
MARVIN D. BENNETT
RICHARD D. BENNETT
BY
ATTORNEY

United States Patent Office 3,077,204
Patented Feb. 12, 1963

3,077,204
ELASTIC BALL CHECK VALVE
Marvin D. Bennett, Glendale, and Richard D. Bennett, La Canada, Calif., assignors to Thomsen Supply, Inc., Los Angeles, Calif., a corporation of California
Filed Dec. 5, 1957, Ser. No. 700,894
4 Claims. (Cl. 137—525)

This invention deals generally with one-way check valves for controlling the flow of fluids and more particularly with an improved check valve which is ideally suited to controlling the flow of granular fluid materials, such as plaster and cement slurry.

It is now common practice in the building construction field to apply cement and plaster materials to building walls by spraying. There is disclosed herein a new and improved constant delivery, positive displacement pump which is especially designed for this use.

The improved one-way check valve of this invention is intended primarily for use in the improved pump described and illustrated herein. It should be understood, however, that this particular use of the valve is intended to be purely illustrative and not limiting in nature.

A broad object of the present invention is to provide a new and improved check valve of the character described.

A more specific object of the invention is to provide a check valve which is ideally suited to controlling the flow of granular fluid materials.

Another object of the invention is to provide a check valve which is so constructed that granular particles in the material flowing through the valve cannot prevent the valve from closing completely whereby the valve is especially well suited in spray systems for plaster, cement and like materials.

Yet another object of the invention is to provide a check valve which is adjustable to vary the distance of travel of its check valve member between open and closed positions so as to adapt the valve to use in a constant delivery plaster and cement spray pump, such as that disclosed herein.

A further object of the invention is to provide a check valve of the character described which is simple in construction, inexpensive to manufacture, relatively immune to wear, and otherwise ideally suited to its intended purposes.

The invention may be best understood from the following detailed description taken in connection with the annexed drawings, wherein:

FIG. 1 is a top plan view, partly in section, of a constant delivery, positive displacement pump embodying a pair of check valves according to this invention and showing the valves in one position of operation;

FIG. 2 is a view of the left-hand end of the pump in FIG. 1 showing the check valves in another position of operation;

FIG. 3 is an enlarged longitudinal section through one of the check valves in FIGS. 1 and 2 showing the ball check of the valve in one position;

FIG. 4 is a view similar to FIG. 3 showing the ball check in another position; and FIG. 5 illustrates a modified check valve according to the invention.

Referring now to these drawings, the illustrated constant delivery pump will be seen to comprise a frame 10 of any suitable design. Mounted on this frame is a hopper (not shown) for receiving a charge of material to be pumped. The pump illustrated is especially designed to pump plaster and cement materials.

Indicated at 14 is a first, or main, piston pump unit. This unit includes a cylinder 16 having an inlet 18. This inlet has an intake passage 18' communicating to the hopper and to the adjacent end of cylinder 16. Pump unit 14 also has a discharge passage 17. Positioned within the inlet 18 is the new and improved one-way check valve 20 of this invention. This valve, which will be presently described, allows flow of material into the cylinder 16 through the inlet 18 but blocks flow in the reverse direction.

Movable in the cylinder 16 is a piston 22 having a piston rod 24. Rod 24 is connected to the lower end of an arm 25, the upper end of which is pivoted on a cross shaft 25a on frame 10. An intermediate point of arm 25 is pivotally connected, through a telescopically adjustable link 26, to a crank pin 27a on a disc 27. Disc 27 is journalled on a terminally threaded, axial stud 28a projecting from the center of a circular flange 28 rigid on one end of a shaft 29 journalled on frame 10. Disc 27 is retained on the stud 28a by a nut, as shown. Frictionally received in aligned holes in the disc and flange is a shear pin (not shown) which is sheared under excessive pumping loads to prevent damage to the equipment.

Shaft 29 is driven from a motor 31 to cause reciprocation of the piston 22 in the cylinder 16. Disc 27 is removable, by removing its securing nut, for replacement by another disc having a crank pin 27a with a different effective crank arm.

Mounted on the frame 10 is a second piston pump unit 32. This second pump unit includes an inlet conduit 34 through which extends the intake passage 34' for the latter unit. Conduit 34 is connected to the first pump unit 14 in such a way that intake passage 34' communicates with the discharge passage 17 of the first pump unit. Disposed in the conduit 34 is a second one-way check valve 36 identical to the one-way valve 20. Valve 36 permits flow from the pump unit 14 to the pump unit 32 but blocks flow in the reverse direction.

Second pump unit 32 includes a cylinder 38 in which is movable a piston 40. Piston 40 includes a rod 42, one end of which is pivotally attached to one end of an arm 44. The other end of arm 44 is pivoted on cross shaft 25a. Pump 32 is provided with approximately two-thirds of the displacement of pump 14 either by making the diameter of cylinder 38 less than that of cylinder 16 or by making the stroke of pump 32 less than that of pump 14.

Arm 44 journals an adjustable cam follower roller 46 which bears against a cam 48 removably keyed on the shaft 29. Roller 46 is adjustable along the arm to adjust the point of contact of the roller with cam 48. Cam 48 is thus rotated in synchronism with crank arm 27a and is operative to cause movement of the piston 40 to the left in its cylinder 38. The left-hand end of the cylinder 38 has an outlet 50 adapted for connection to a discharge hose 52, for example. This hose terminates in a nozzle (not shown). The discharge passage 50' of the second pump unit extends through the outlet 50. Cam 48 is removable for reasons to be seen.

Referring now to FIGS. 1 and 2, as well as FIGS. 3 and 4, illustrating valve 20 of this invention in enlarged detail, the numeral 56 denotes an elastic check valve member in the form of a rubber ball. Ball 56 is contained in a cylindrical housing 58. Housing 58 has a passage extending therethrough which is formed with a reduced inlet portion bore 60 opening into an enlarged passage portion or chamber 62. Extending across the bore 60 are cross pins 64 which act as stops to limit left-hand travel of ball 56 in bore 60.

Bore 60 has a diameter approximately the same as or just slightly less than the diameter of ball 56, while the diameter of chamber 62 is substantially larger than ball 56. Pins 66 act as stops to limit right-hand movement of ball 56 in chamber 62. From this description, it will be seen that ball 56 is movable from bore 60 into chamber 62 in response to flow to the right through the valve. The clearance between the ball and the wall of chamber 62 provides a flow space about the ball.

When flow in the opposite direction occurs through the valve, ball 56 is forced into the bore 60 and against the cross pins 64 at the left-hand end of the bore. Axial pressure on the ball causes radial expansion of the latter against the wall of bore 60 to form a seal, as shown in FIG. 4. During movement of ball 56 into the bore 60, the wall of the latter is wiped clean by the ball (FIG. 3) so as to permit an efficient seal to be formed. Valve 36 is identical to valve 20 just described.

The illustrated valve is highly desirable for the use described since it is less prone to wear and accomplishes a liquid tight seal even with granular and abrasive materials, such as plaster and cement. Conventional check valves are not suitable for these latter materials inasmuch as any particles of the material on the seat of the check valve would prevent the latter from completely closing. During the pumping stroke, therefore, water in the material will be squeezed out past the slightly unseated check valve. This results in instantaneous setting of the material in the valve and jamming of the latter.

Operation of the illustrated pump thus far described is as follows. Assuming the hopper (not shown) to contain a charge of material to be pumped, such as moist plaster or cement, each right-hand suction stroke of the piston 22 in the primary pump unit 14 draws material into the cylinder 16 from the hopper. This material is pumped from the cylinder 16, through conduit 34 to the second pump unit 32 during the left-hand, pumping stroke of the piston 22. A portion of this material flows into cylinder 38 of the second pump unit.

The material entering the cylinder 38 of the second pump unit 32 exerts a force on the piston 40 tending to move the latter to the right and force the roller 46 on arm 44 against the cam 48. The shape of the cam 48 is such as to allow controlled right-hand movement of piston 40, under the action of this force, during the delivery stroke of the primary pump unit.

The parts are so proportioned that during this delivery stroke of the primary pump unit, a portion of the material delivered to the second pump unit is absorbed by right-hand movement of the piston 40. The remainder of the delivered material flows through the discharge 50 of the second pump unit to the hose 52.

During each suction stroke of the primary pump unit, the piston 40 of the second pump unit 32 is forced to the left by the cam 48. This pumping stroke of the second pump unit displaces the material remaining in the latter unit after the previous delivery stroke of the primary pump unit. Thus, during each delivery and suction stroke of the primary pump unit 14, a portion of the material pumped by the latter pump unit is discharged through the discharge 50 of the second pump unit.

The second pump unit 32, therefore, in effect, evens out the surges in the flow of material from the first pump unit 14 so as to maintain a substantially uniform delivery of material to the pump discharge 50 and hose 52.

In use of the illustrated pump for spraying cement, plaster, and other similar materials, it is desirable to vary the output of the pump for different jobs. Thus, when spraying a finish plaster coat, the rate of delivery of the pump is preferably less than for heavy base coats.

Adjustment of the pump output may be accomplished by replacing the crank plate 27 by one having a different effective crank arm for its crank pin 27a, and replacing the cam 48 by a similarly shaped cam which will alter the total stroke of the second pump unit to fit the new stroke of the first pump unit.

Moreover, materials of the type under discussion have different compression ratios. To this end, the cam 48 is removable for replacement by a cam which is configured to suit the particular material to be pumped. Thus, several cams may be provided for selective mounting on the pump, each cam being designed for a particular material or materials whose compression ratios fall within a particular range.

Compensation for a change in the compression ratio from one material to another may also be accomplished by adjusting the travel of the ball 56 in the check valves 20 and 36 of the invention, as illustrated in FIG. 5. In this figure, the numeral 100 denotes a sleeve formed with the inlet bore 60, which is slideable in the valve housing 58'. This sleeve mounts the cross pins 64 which limit movement of the ball 56 in the bore 60.

Sleeve 100 is adjusted in the axial directions indicated by a threaded shaft 102 operable exteriorly of the housing 58. This adjustment of the sleeve has the effect of varying the travel of the ball 56 during closure of the valve and hence the volume of material necessary to effect closure of the valve.

In use, when a material to be pumped has less compressibility than the particular material for which the cam 48 is designed, the sleeve 100 will be shifted to the left, as viewed in FIG. 5, to increase the travel of the ball 56. This has the effect of increasing the travel of the pump piston necessary to close the valve and hence compensating for the lesser travel of the piston required to compress the material. With materials having greater compressibility, of course, the sleeve 100 is adjusted in the opposite direction.

Numerous modifications in design and arrangement of parts of the invention are possible within the scope of the following claims.

We claim:

1. A check valve comprising a valve housing having a fluid passage therethrough defined in part by a smooth walled cylindrical bore which opens at one end into an enlarged chamber, an elastic ball check in said passage movable between a closed position in said bore and an open position in said chamber, said ball being receivable into said bore and being elastically expandable to form a seal therein, and said ball having a diameter which is appreciably less than the cross-sectional dimensions of said chamber, stop means in said chamber to limit opening movement of the ball in the chamber in a direction away from said bore, and at least one cross pin extending across the medial portion of said bore within the cylindrical wall portion thereof to form an abutment therein which prevents extrusion of the ball through the bore and limits closing movement of the ball therein, and which, when the ball is forced thereagainst by fluid pressure, forms a depression in the ball in the medial region of the bore and a consequent compression in the center region of the ball such as to thrust the ball off said pin when said fluid pressure is relieved.

2. The subject matter of claim 1 including an additional cross pin extending across said bore at approximately right angles to and approximately coplanarly with the first-mentioned cross pin.

3. A check valve comprising a valve housing having a fluid passage therethrough defined in part by a smooth walled cylindrical bore which opens at one end into an enlarged chamber, an elastic ball check in said passage movable between a closed position in said bore and an open position in said chamber, said ball being receivable into said bore and being elastically expandable to form a seal therein, and said ball having a diameter which is appreciably less than the cross-sectional dimensions of said chamber, stop means in said chamber to limit opening movement of the ball in the chamber in a direction away from said bore, and at least one cross pin extending across said bore within the cylindrical wall portion thereof to form an abutment therein which prevents extrusion of the ball through the bore and limits closing movement of the ball therein, and which, when the ball is forced thereagainst by fluid pressure, forms a depression in the ball and a consequent compression of the ball such as to thrust the ball off said pin when said fluid pressure is relieved.

4. A valve comprising a valve housing having a fluid passage therethrough defined in part by a smooth walled cylindrical bore, an elastic ball check in said passage movable between a closed position and an open position in said bore, said ball being receivable into said bore and being elastically expandable to form a liquid tight seal therein, and at least one cross pin extending across said bore to form an aubutment therein which prevents extrusion of the ball through the bore and limits closing movement of the ball therein, and which, when the ball is forced thereagainst by fluid pressure, forms a depression in the ball and a consequent compression of the ball such as to thrust the ball off said pin when said fluid pressure is relieved.

References Cited in the file of this patent

UNITED STATES PATENTS

| | | |
|---|---|---|
| 343,327 | Lowrie | June 8, 1886 |
| 879,594 | Simpson | Feb. 15, 1908 |
| 1,144,657 | Keller | June 29, 1915 |
| 1,515,998 | Clark | Nov. 18, 1924 |
| 1,576,855 | Serres | Mar. 16, 1926 |
| 2,236,477 | Fuchs | Mar. 25, 1941 |
| 2,326,302 | Linstedt | Aug. 10, 1943 |
| 2,431,593 | Strike | Nov. 25, 1947 |
| 2,448,104 | Longenecker | Aug. 31, 1948 |
| 2,545,000 | Martin | Mar. 13, 1951 |
| 2,685,259 | Longenecker | Aug. 3, 1954 |
| 2,833,306 | Cummings | May 6, 1958 |

FOREIGN PATENTS

| | | |
|---|---|---|
| 56,523 | Germany | May 14, 1891 |